May 3, 1960     M. N. MUSGRAVE     2,935,105
PICKLE PUNCTURING MACHINE
Filed Oct. 7, 1957
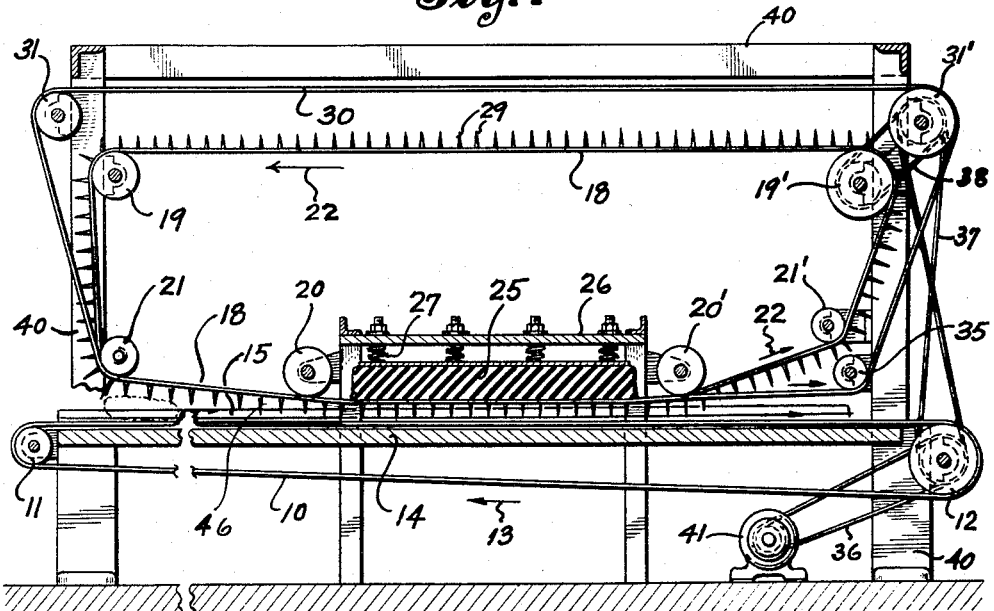
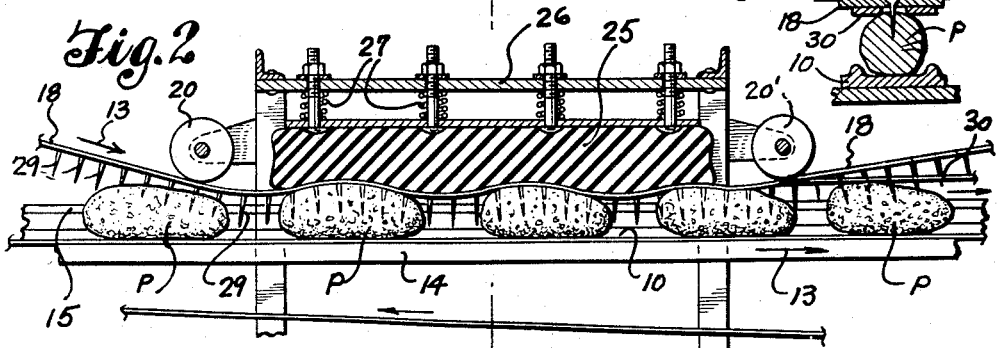
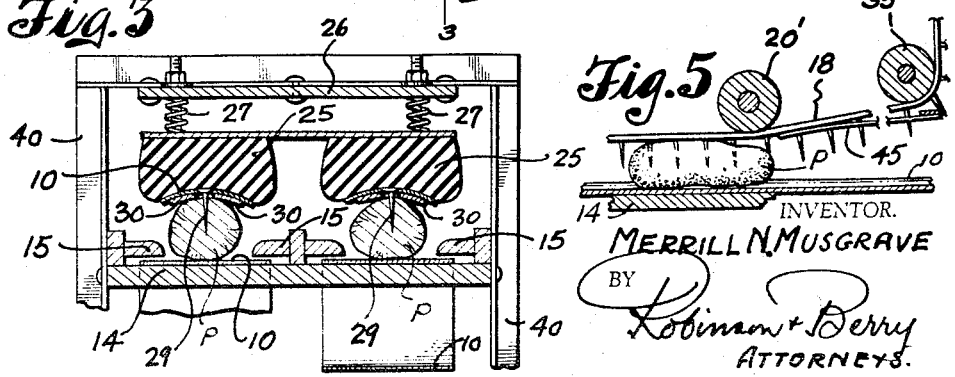
INVENTOR.
MERRILL N. MUSGRAVE
BY
Robinson + Berry
ATTORNEYS.

United States Patent Office 2,935,105
Patented May 3, 1960

2,935,105

PICKLE PUNCTURING MACHINE

Merrill N. Musgrave, Seattle, Wash.

Application October 7, 1957, Serial No. 688,448

1 Claim. (Cl. 146—56)

This invention relates to a mechanism to be used in the making of pickles from such edible vegetables as cucumbers, and the like, by that method which includes the subjecting of the prepared vegetables to soaking in brine for their satisfactory pickling and preservation.

More particularly, the present invention relates to a power driven mechanism for the puncturing of articles that are to be pickled in order that a quicker, more uniform and better treatment by the brine solution will take place when they are placed therein.

It is not desired to limit the present apparatus or machine to the puncturing of cucumbers for pickling. Therefore, for the purpose of the following specification, any article which can be subjected to the present puncturing operation in the manner disclosed, whether it be a cucumber, tuber or herb, will be hereinafter designated as a "pickle."

It is the principal object of the present invention to provide a machine or mechanism for the expeditious and uniform puncturing of pickles preparatory to their being subjected to soaking in brine, and whereby the puncturing operation will be effected in such manner that it will not change the normal appearance of the pickle, or destroy its desirability and will not cause any tearing or rupturing of its exterior or interior structure.

More specifically stated, the present invention pertains to a novel machine for the above stated purpose, comprising coacting belts between which the pickles are received and advanced for puncturing and wherein one of the belts is equipped with pickle puncturing needles.

Further objects and advantages of the present invention reside in the details of construction and combination of parts comprised by the machine and in their functional relationship and in their mode of operation, as will hereinafter be described.

In accomplishing the above mentioned and other objects of the invention, I have provided the improved details of construction, the preferred forms of which are illustrated in the accompanying drawings, wherein:

Fig. 1 is a side view of a mechanism, or machine, embodied by the present invention for the puncturing of pickles, and illustrating therein the conveying of pickles by one belt into contact with the puncturing needles carried by the other belt.

Fig. 2 is an enlarged sectional detail illustrating the gradual entry of the puncturing needles into the pickles as conveyed by and between the belts. Also showing the use of stripper belts for the removal of the punctured pickles from the puncturing needles.

Fig. 3 is an enlarged cross-section, taken on the line 3—3 in Fig. 2, showing the relationship of conveyor belt, needle carrying belt, stripper belts, and a yieldable means which urges the needles into the pickles.

Fig. 4 is a sectional detail showing an alternative form of means for pressing the needles into the pickles, and illustrating also alternative means for retaining the pickles properly on the conveyor belt as advanced.

Fig. 5 is a sectional detail illustrating an alternative stripper means.

Referring more in detail to the drawings:

In its present preferred form, the machine embodying this invention as shown in Fig. 1, comprises an endless conveyor belt 10 that is mounted for horizontal travel about parallel rollers 11 and 12. One of rollers is driven by the means shown to cause the belt to travel in the direction indicated by the arrow 13 which is adjacent thereto in Figs. 1 and 2. The top run of belt 10 is supported by and for sliding travel upon a flat, horizontal and fixedly mounted plate or table 14; this plate or table 14 is equipped lengthwise thereof and on its top side with paired, parallel rails 15 defining lanes within which the belt 10 is confined for endwise travel and whereby the pickles conveyed by the belt will be held substantially in endwise alignment as advanced.

It will here be mentioned that Fig. 3 illustrates the machine as being designed to convey two lines of pickles. However, each line is like the other and the description of one will apply equally to the other.

Mounted directly above and operable in a direction lengthwise of the belt 10, is a continuous belt 18 supported for travel about an upper set of rollers 19 and 19'; a lower set of rollers 20 and 20' which are mounted at the same horizontal level, and another or intermediate set of rollers 21 and 21'; the latter set being located somewhat above the level of the rollers 20—20' and near opposite ends of table 14. Roller 19' is herein shown to be so driven as to cause the belt 18 to travel in the direction indicated by the arrow 22 adjacent thereto in Fig. 1. That portion of the lower run of the belt 18 which extends between the lower pair of rollers 20—20' is located directly above and parallel to a portion of the top run of belt 10 as carried on table 14, and is spaced therefrom to provide an adjustable space between them for the passing of the pickles, for their puncturing as presently described. The means provided for driving the belts 10 and 18 operates to advance them at exactly the same lineal speed and in the same direction across the table top.

That portion of belt 18 that extends between the rollers 20 and 20' is shown in Fig. 2 to be backed at the top side, by a resilient pad or backing member 25. This pad is adjustably supported from a horizontal plate 26 that is fixed in the frame, and is urged downwardly against belt 18 with an easy yielding force by a plurality of coiled spring 27 that are interposed between the pad and plate 26.

In some operations it is not necessary to employ the thick resilient pad 25 and it can be replaced by a light weight plate 28 as shown in Fig. 4. This plate 28 as shown is supported by hanger bolts and is caused to bear yieldingly against the belt 18 by light coil springs 27 in the same manner as explained in connection with the pad 25.

Fixed in belt 18 at regular intervals of spacing along its longitudinal center line, in a continuous row are short needles 29; these needles extending through and to the outside of the belt and are adapted to pierce the pickles as they are conveyed by the belt 10 across the table 14 beneath that portion of belt 18 that extends between the rollers 20 and 20' as will presently be understood.

Associated with the conveyor belt 18 are paired stripper belts 30—30 which are mounted in the vertical plane of belt 18, closely at opposite sides of the row of needles 29 as guided across the pad 25 by the rollers 20—20'. It is shown in Fig. 1 that the paired belts 30—30 are carried above the top run of the belt 18 by rollers 31 and 31' and that, from these rollers, they extend downwardly and about the rollers 21 and 21' and 20 and 20'. Between the roller 21, which is at the left hand side of Fig. 1, and the roller 20' at the right hand end of pad 25, the paired belts 30—30 engage flatly against the underside of belt 18 closely along opposite sides of the row of puncturing needles as in the manner shown in Fig. 3. From the roller 20' at the right hand side, the belts 30—30 continue to travel substantially horizontally and in slight angular divergence from the upwardly directed portion of belt 18, and pass about a guide roller 35 and then upwardly and about the roller 31'.

In the present drawings, I have indicated the machine as having a frame structure 40 for support of the various rollers, plates and pad 25. Also, I have shown the several belts to be driven through conventional belt connections, 36, 37 and 38 with an electric motor 41. However, any suitable motive means and any suitable drive for the rollers may be employed so long as the conveyor belts and stripper belts are caused to move at the same lineal speeds and in the direction along their contacting runs.

Assuming that the various parts of the mechanism are assembled and driven as described, the use of the machine is as follows: The person or persons feeding the pickles into the machine stand at the left hand end of conveyor 10, as seen in Fig. 1, and by hand, or otherwise, places the pickles designated by reference character P on belt 10 between the guide rails 15—15. The belt 10 advances the pickles endwise along the guideway beneath the downwardly leading portion of belt 18 that extends between the rollers 21 and 20. As the pickles move into the pocket, provided by the converging belts 10 and 18, and designated at 46 in Fig. 1, puncturing needles fixed in belt 18 are pressed gradually thereinto as will be understood by referring to Fig. 2. The downward pressure of resilient pad 25, or plate 28 of Fig. 4, against the belt 18 will cause the needles to gradually enter directly into the pickles. The needles are in such spacing that each pickle of an average size will receive, when passing through the machine, a plurality of punctures and they are of such length that they will pierce the pickles beyond the center.

As the punctured pickles are advanced beyond the roller 20' the belt 18 and the paired stripper belts 30—30 move gradually apart. Thus, the belts 30—30 by reason of their closeness to each other, and their movement away from belt 18, effect the stripping of the pickles from the needles. The punctured pickles are then carried from the machine by the belt 10.

As an alternative means for effecting this stripping operation, spring fingers as at 45 in Fig. 5 may be fixedly supported on frame 40 in the same angular divergence from the belt 10 as the diverging portion of the belt 30. Also, as an alternative, the guide rails 15—15 as shown in Fig. 3 may be eliminated and the belt 10 equipped with parallel longitudinally extending ribs or beads as shown at 48—48 in Fig. 4, to retain the pickles properly on the belt for the puncturing operation.

Such machines provide for the quick, easy and satisfactory puncturing of the pickles for a better and more uniform penetration by brine when placed therein.

What I claim is:

A pickle puncturing machine comprising a driven conveyor belt on which pickles may be placed and conveyed through a puncturing station, a puncture forming belt, means mounting said belts for travel, and establishing cooperatively arranged horizontal runs of said belts in spaced, parallel planes for the reception and holding of pickles between them for advancement through the puncturing station, means for driving said belts to cause the cooperatively arranged runs thereof to travel in the same direction and at the same speed, a plurality of sharp pointed, small diameter pickle puncturing needles applied to the puncture forming belt in close relationship, said needles projecting toward said driven conveyor belt and extending more than one-half the distance between said belts, resilient, rubber-like backing means mounted above and engageable with the puncture forming belt as it passes through the puncturing station to urge the pointed needles into the conveyed pickles at least to the center thereof, said backing means extending substantially the full length of the puncturing station, means resiliently mounting said backing means for vertically adjusting the distance between the backing means and said conveyor belt, a pair of spaced stripping belts positioned below and moving with said puncture forming belt through the puncturing station, and said stripper belts diverging from said puncture forming belt at a relatively slight angle whereby the needles are gradually removed from the pickles as the pickles leave the puncture station.

References Cited in the file of this patent

UNITED STATES PATENTS

| | | |
|---|---|---|
| 859,671 | Langer | July 9, 1907 |
| 2,302,701 | Lang | Nov. 24, 1942 |
| 1,714,221 | Gradoff et al. | Aug. 2, 1955 |
| 2,783,803 | Weckel et al. | Mar. 5, 1957 |